United States Patent [19]

Wegmann et al.

[11] 3,844,806

[45] Oct. 29, 1974

[54] PROCESS FOR THE PRODUCTION OF HIGHLY CONCENTRATED DYESTUFF AND PIGMENT PREPARATIONS

[75] Inventors: Jacques Wegmann, Bettingen; Carl Becker, Basel, both of Switzerland

[73] Assignee: CIBA-GEIGY AG, Basel, Switzerland

[22] Filed: Jan. 5, 1973

[21] Appl. No.: 321,168

[30] Foreign Application Priority Data

Jan. 7, 1972  Switzerland............................ 237/72

[52] U.S. Cl............. 106/193 D, 106/198, 106/241, 106/243, 106/308 Q, 106/308 P, 260/29.6 H, 260/34.2, 260/41

[51] Int. Cl........................ C08h 17/02, C08f 45/24

[58] Field of Search.... 106/204, 193, 308 Q, 308 P, 106/193 D, 41 C, 243, 241, 198, 309; 260/41 C, 29.6 H

[56] References Cited
UNITED STATES PATENTS

| | | | |
|---|---|---|---|
| 2,556,727 | 6/1951 | Lane.................................. | 106/309 |
| 2,649,382 | 8/1953 | Vesce................................. | 260/41 C |

*Primary Examiner*—Theodore Morris
*Attorney, Agent, or Firm*—Joseph G. Kolodny; Edward McC. Roberts; Prabodh I. Almaula

[57] ABSTRACT

A process for the production of dyestuff preparations is described comprising subjecting a suspension of a difficultly water-soluble or water-insoluble dyestuff in water and/or an organic solvent having limited solubility in water and forming a two-phase system, optionally in the presence of a deflocculating agent to a particle-size-reducing operation until the particle size of the said suspension is preferably at most 2 microns; the subsequent addition, after removal of mechanical grinding agents present, of the water necessary for the formation of a two-phase system, or of the organic solvent having limited solubility in water; the addition to the dyestuff suspension, after formation of the two-phase system, of at least one high-molecular carrier, particularly cellulose ether or -ester, soluble in water or in the organic solvent having limited solubility in water, but insoluble in the two-phase system; the treatment of the carrier suspension until the organic phase containing the dyestuff has become evenly dispersed over the surface of the high-molecular carrier; the subsequent removal of the solvent; and, finally, the drying of the obtained dyestuff preparation, or dispersion thereof in water or in an organic solvent.

12 Claims, No Drawings

PROCESS FOR THE PRODUCTION OF HIGHLY CONCENTRATED DYESTUFF AND PIGMENT PREPARATIONS

A process for the production of coloured moulded shapes from high-polymeric, fully synthetic resins is described in the French Pat. No. 2,072,866.

The process consists in the treatment of water-insoluble, hydrophobic, high-polymeric and fully-synthetic resins not soluble or greatly swellable in either of the two liquid phases of a two-phase system, in the form of granules, chips or powder, in a mixture of hydrophilic and organophilic solvents, these having only limited solubility in each other and forming a two-phase system, with dyestuffs of which the solubility in the organophilic part of the two-phase system is greater than that in the hydrophilic part; the removal of the solvents; and the moulding, optionally with addition of amounts of untreated synthetic resin, from the solution or from the melt.

If the synthetic resins are used in the form of powder, then, surprisingly, it is possible to produce high-percentage pigment preparations containing even fifty per cent and more of dyestuff.

Polyamides, polyesters and particularly polypropylene and polyacrylonitrile in powder form were known as suitable synthetic resins for the last-named embodiment.

It has now been further discovered that numerous synthetic resins which are indeed in powder form, but which, unlike the above mentioned synthetic resins, are neither soluble nor greatly swellable in the organic part of the two-phase system, can be used as carrier resins likewise with a very high degree of success.

The sole important factor is that they themselves are insoluble in the two-phase system and that they in the solid state, as powder with a large surface area, can be coated with the organic phase of this system.

The process thus renders possible the production of readily dispersible, concentrated, liquid to solid preparations of dyestuffs and pigments with a whole range of other high-molecular carrier substances, which offers the possibility of an appreciable extension of the field of application of such preparations and hence represents a considerable advance in the art.

The process comprises the subjection of a suspension of a difficulty water-soluble or water-insoluble dyestuff in water and/or an organic solvent having limited solubility in water and forming a two-phase system, optionally in the presence of a deflocculating agent preferably soluble in the organic part of the grinding medium, to a particle-size-reducing operation until the particle size of the said suspension is at most 10 microns, preferably at most 2 microns; the subsequent addition, after removal of mechanical grinding agents present, of the organic solvent having limited solubility in water, necessary for the formation of a two-phase system, or water; the addition to the dyestuff suspension, after formation of the two-phase system, of at least one high-molecular carrier in solid form, particularly cellulose ether or -ester, soluble in water or in the organic solvent having limited solubility in water, but insoluble in the two-phase system; the treatment of the carrier suspension until the organic phase containing the dyestuff has become evenly dispersed over the surface of the high-molecular carrier; the subsequent removal of the solvent; and, finally, the drying of the obtained dyestuff preparation, or dispersion thereof in water or in an organic solvent.

Although it is possible to obtain liquid preparations by only partial removal of the solvents used for the reaction, it is as a rule advantageous to produce solid preparations in order, for one thing, not to limit their field of application to specific solvents.

For the obtainment of as good a coating as possible it is important that the high-molecular carrier substance has the greatest possible surface area; it need not, however, be so fine that it can no longer be filtered off, for, in contrast to all prior known processes of a similar kind, it is not the dyestuff particles which are coated with the particles of synthetic resin, but, quite the reverse, it is the polymer particles serving as the carrier which become coated as uniformly as possible with dyestuff particles, a process effected with the aid of the film-forming organic phase.

The carrier resin can be dissolved in one of the two phases, whereby it precipitates on formation of the two-phase system and offers to the dyestuff suspension a particularly large surface area for coating. Usually, however, the synthetic resin precipitates with this procedure in a difficulty filterable, jelly-like or viscous form. It is therefore better if the finely powdered synthetic resin is not stirred in until after completed formation of the two-phase system.

Most advantageous is a combination of both possibilities entailing the dissolving of a small portion of the carrier polymer in the solvent, and the stirring-in of the main portion after formation of the two-phase system. The small portion produces a very great enlargement of the available surface area but settles then, together with the dyestuff, onto the main portion, so that nevertheless a good filterable form is obtained.

Whereas the size of the carrier particles can and may vary within wide limits between 1 and 500 $\mu$, this is not so in the case of the dyestuff particles. On subsequent application of the preparations, the carrier resin of course goes into solution, while the dyestuff particles remain in most cases as distict particles.

It has been found that the desired particle size is below 10 microns, preferably below 2 microns, and that the required homodispersity is best obtained by grinding in the solvent with the addition of quartz sand or of glass or steel balls. Mills of this kind are commerically obtainable, the Perl-Muhle (bead mill) and the Dyno-Muhle may be mentioned as examples. The mechanical grinding may be optionally be combined with a chemical treatment, such as dissolving and reprecipitating or recrystallising.

A particle size of 1-2 microns suffices as a rule to ensure stability of the dispersion in the application medium. If the dyestuff dissolved in the application medium, then there is no purpose in grinding finer, since more carrier resin is then necessary. Only in the case of pigments of which the particles remain unchanged is, optionally, a particle size of below one micron advantageous for colour intensity and brilliance, and this particle size can moreover certainly be attained.

For example, the dyestuff suspension can be ground in water. The mechanical particle-size reducing process, however, is better and proceeds more rapidly where grinding is performed in the solvent. As the last-named in any case has to be regenerated by azeotropic distillation, since protection of the environment should be the urgent concern of every scientific investigator, the most rational and, fortunately, at the same time best procedure is to use for the grinding operation directly the water-containing organic phase of the azeotropic mixture.

Dispersing agents for stabilisation of the dispersion are necessary, particularly in the case of grinding in water. Under no circumstances must they however prevent the formation of a settled two-phase system, by, for instance, emulsification of the organic phase, as consequently the film-forming capacty of this would be destroyed and no further coating possible.

As a rule, particularly in the case of grinding in the organic phase, it suffices to dissolve in the organic phase a small portion of the high-molecular substance to be coated to prevent the mass being ground from becoming thick, thus rendering the mechanical particle-size reducing operation difficult or even impossible. The action of the addition, which can be 0.1 to 10 percent of the dyestuff to be ground, is not clear with regard to the mechanism. Presumably, the small amount of carrier acts as deflocculating agent for the finest dyestuff fractions, and in that way lowers the viscosity. High carrier additions are to be avoided, as these have as a rule the reverse action, i.e., a thickening action.

It is most advantageous to use as deflocculating agent the carrier resin to be coated, because by this means the extent of the field of application of the preparation is affected to the minimum extent. Where this is not possible, or not sufficiently possible, additions of soluble polyamides and polyureas, especially however of alkylated polyvinylpyrrolidones, have proved satisfactory. The last-mentioned are obtainable commerically under the name of 'Antarone.'

By virtue of these additives which, specially in combination with cellulose derivatives, can have a synergistic action, it is possible to obtain grinding-concentrations of ca. 10–60 percent, preferably 30–50 percent, of dyestuff, and hence to reduce the consumption of solvent to a minimum.

Suitable solvents are all solvents having limited solubility in water and producing a two-phase system. The limited water-solubility is necessary in order to obtain above the aqueous phase the most suitable layer-depth of the organic phase serving to effect coating. The solubility should not be below 1 g/l, but also should not exceed 300 g/l.

Among the many in themselves suitable solvents such as aldehydes, esters, ethers and nitriles, the alcohols and ketones take precedence, not least of all on grounds of ecology, of safety and of price.

Methyl ethyl ketone, acetylacetone, and cyclohexanone may be mentioned as examples of well suited ketones; and butanol, cyclohexanol, benzyl alcohol, phenyl glycol and hexyl glycol as well suited alcohols, combined ester-ethers such as ethylglycolacetate are also suitable.

The choice of solvent is governed not least of all by the carrier resin. This must not be swelled excessively by the solvent even in the two-phase system; principally, however, it must rapidly and readily give up absorbed solvent. The best choice is easily determined by preliminary tests. The ratio of water to the organic phase in the case of coating depends in the first place on the solubility of the organic solvent in water; as a rule, 1 to 4 parts of water are used to 1 part of solvent. Only after completed coating may further dilution with water be carried out to completely remove the solvent film.

The addition of the synthetic resin carrier should be accompanied by a stirring or agitation as vigorous as possible, whereas a gentle stirring suffices during the subsequent dilution with water. A violent agitation could lead to a damaging of the dyestuff film as a result of abrasion, an effect, however, which cannot occur as long as there is still solvent present in excess as the second phase, since any surface damaged by abrasion would be immediately re-coated.

Room temperature is most suitable for the carrying out of the grinding and coating operation, although also higher or lower temperatures may be used. The removal of the solvent is effected by dilution and filtration, or by steam distillation and subsequent filtration.

In contrast to the insoluble carrier resins according to the above mentioned parent application, the carriers according to the present application are somewhat more tricky to coat with regard to possible deformation due to the solvent. Particular attention must be given to ensuring complete removal of the solvent, as otherwise cornification and hence poor dispersibility, and other secondary effects, can occur.

It is altogether surprising that this class of carriers can be coated in this simple and certain way.

The following may be mentioned as suitable carrier substances according to the present invention: the relatively high-molecular salts of abietic acid, of behenic acid as well as their reduction products, as well as their metal salts and esters with high-molecular alcohols. They dissolve of course in the organic solvent but not in the aqueous two-phase system.

Also to be mentioned are low-molecular polymers of ethylene, also polyvinyl chloride and its copolymers with vinylacetate, polyacrylic acid esters and methacrylic acid esters, mixed polymers of polyacrylonitrile with polyvinyl and polyvinylidene chloride, polyvinyl ethers of octadecyl alcohol, polyvinylisobutyl ethers, alkyd resins, as well as readily organosoluble polyamides and polyurethanes. There may also be mentioned: cyclohexanone resins and hydrocarbon resins, such as polyterpenes, polyindenes; alkyl aromatic hydrocarbon resins; lower molecular aromatic vinyl compounds; and aromatic terpolymers with acrylonitrile.

Particularly valuable results are obtained with modified natural polymers such as, e.g., with ethers and esters of cellulose. Mentioned as examples are the water-insoluble but organosoluble ethers such as ethyl, propyl, and ethylhydroxyethyl ethers, the esters such as acetyl, chloroacetyl and nitro esters, as well as the mixed esters such as cellulose acetobutyrate and cellulose acetate phthalate.

Also water-soluble derivatives such as methyl-, carboxymethyl- and hydroxyethylcellulose can be used.

Even a derivative such as hydroxypropylcellulose, which dissolves both in water and in the organic solvent such as, e.g., in cyclohexanone, but is insoluble in the two-phase system, can be very well coated and processed into dyestuff preparations.

The ratio of dyestuff to carrier can vary within wide limits between 1:9 and 9:1. A dyestuff preparation with the highest possible percentage of dyestuff is desired in most cases; a proportion of 50 percent dyestuff may be given as a very good average value.

It is in many cases possible by the present process, presumably on account of the careful treatment of the carrier, which is not subjected to any mechanical treatment resulting in damage, to produce higher percentage preparations: 60 – 90 percent, preferably however 75 – 85 percent preparations. In spite of this extremely low proportion of carrier, a satisfactory and, in particular, residue-free re-dispersibility of the powders is ensured.

Suitable difficultly-water-soluble to water-insoluble dyestuffs for the present process are diluent-free dispersion dyestuffs, i.e., those free from water-soluble dispersing agents and fillers such as lignin sulphonates. They have as a rule a water solubility of the order of 1 to 10 mg/l. It is advantageous if they are as difficultly soluble as possible in the organic part of the two-phase system, and are present only in the dispersed form, not in the dissolved form.

Dispersion dyestuffs can belong to the most diverse classes of constitution. As examples are mentioned the azo and anthraquinone derivatives, the heterocycles such as thiazoleanthrones, quinophthalones, anthrapyrimidines, naphthalimides, pyrazoleanthrones, diazines, acridines, acridones, also stilbene dyestuffs and nitro dyestuffs.

The water-insoluble metal-complex dyestuffs of azo and formazyl dyestuffs are also suitable. Metals which can be used for complex formation are Al, Ni, Cu, Cr and Co, as well as Fe. They can also be employed in their metal free form as precondensates or as metal complexes.

Suitable pigment dyestuffs are: inorganic pigments such as carbon black or delustring agents such as titanium dioxide, also organic delustring agents such as melamine and urea/formaldehyde resins, particularly however polymer-soluble and -insoluble organic pigments such as, e.g., such ones from the classes of naphthol and vat pigments, phthalocyanines, dioxazines, indolinones, nitro, perinone or quinacridone dyestuffs, as well as from classes of other polycyclic heterocycles. Also optical brighteners may be used, preferably in conjunction with delustring agents.

The liquid to solid preparations produced by the process described in the foregoing have a very large field of application, this being to a great extent governed by the carrier, but in some cases also by the dyestuff. As a rule, processing is carried out with a synthetic resin which can be identical to the one used as carrier; where this is not the case, the different resins must have good compatibility with each other. The high measure of diversity requires a relatively large number of preparations with different carriers.

Dispersions dyestuffs containing a water-soluble carrier such as, e.g., hydroxypropylcellulose, are used for the printing and dyeing of synthetic fibres from an aqueous medium, similarly corresponding preparations with a pigment base, optionally in combination with cross-linkable fixing agents. Dispersions dyestuffs with organosoluble carriers are employed in the solvent dyeing of synthetic fibres, e.g., from perchloroethylene; they are however used, in particular, in sublimation-transfer printing.

Pigment dyestuffs with organosoluble carrier resins are widely used not only in the printing of paper, but also in the colouring of inks and lacquers. Of particular extent and importance, however, is the field of application in the case of the dyeing of plastics in the mass, especially fibres, from a solution or from the melt. Preparations of a similar kind to those described here are known per se and for a long time a wide range has been available commerically. They can be produced by so-called substrate-grinding and by precipitation processes; in particular, however, by kneading processes in apparatus known as trough-kneaders. The trough-kneading process is to be considered as the technically most important, and the only process being practiced on an industrial basis on a large scale.

This process is very costly with regard to equipment and power consumption. Kneading moreover has to be carried out in the presence of high amounts of salt and together with solvents, the regeneration of which is so difficult and expensive that the regeneration, for example, of diacetone alcohol and its repeated application has so far not been developed further than the experimental stage. The fact that the carrier resins are in some cases very severely damaged by kneading, i.e., chemically decomposed, has already received mention. Various carriers cannot therefore be used in this process, a limitation which does not apply with respect to the process according to the present application. Since the solvents are moreover recovered as 10 to 20 percent aqueous solutions, are azeotropically distillable and employable in a circulation system, the advantage with respect to the environment in this regard too is obvious.

The disadvantages — of which there are many — of the kneading process are known, and there has been no lack of efforts to obtain on a different basis qualitatively equivalent or better products. Solvent processes too have been tried out in numerous variations but without technical success. With regard to examples, reference is made to the German 'Auslegeschrift' No. 1,469,621. A process is suggested in which both the polymer and the dyestuff are dissolved in a solvent, and subsequently jointly precipitated by being discharged into water. The suggestion in the U.S. Pat. No. 3,361,705 is based on the same principle. Both processes have the disadvantage that the dyestuffs, whilst indeed being fine, possess however a varying and difficulty controllable particle size. Reproducibility, therefore, does not satisfy industrial requirements; moreover, the filter values are too poor to ensure smooth processing.

A grinding known as substrate-grinding is described in the Swiss Patent Application No. 455,099. Carrier polymers and pigment are subjected, in an inert solvent not capable of dissolving or of swelling the dyestuff or the polymer, to a sand-grinding treatment. The disadvantages of this procedure are manifold. Many synthetic resins cannot be ground at all, or are not ground finely enough to be cleanly separated from the sand. By the time that the dyestuff suspension has attained the required degree of fineness, the polymer is frequently so severely damaged that it can no longer be properly dissolved in the application medium, i.e., decomposition is far more pronounced than in the case of kneading. It can be said that substrate grinding was the predecessor of the kneading process, and that it led, by virtue of the unsatisfactory results it yielded, to the development of kneading processes, which in themselves are unpleasant.

Compared with these known processes and products, the process according to the present application and the preparations produced by it possess a whole range of important advantages: The dispersion of the dyestuffs can be passed, after completion of grinding, through microfilters, e.g., through Kuno-filters having a pore-size of 10 μ. The preparations therefore certainly contain no impurities, such as are frequently unavoidable in kneaded preparations where the impurities are taken in with the raw materials.

The carrier resins, as already mentioned, are not mechanically treated and do not therefore suffer damage, which is undoubtedly a contributory factor in the attainment by the present process of high-percentage preparations of low carrier content.

The homodispersity is particularly good, which is reflected in very satisfactory filter values, the results of which are constancy of performance and few interruptions in production.

If the development hitherto in this field of dyestuff-preparations is considered, then the common outstanding feature emerges that the aim has always been to obtain fine dyestuff particles and to coat them with a thin protective layer of even finer particles of synthetic resin, in order to prevent them undergoing coarsening as a result of aggregation.

In the case of the process according to the present invention, however, the decisive inventive step lies in the fact that the conception on which the process is based deviates completely from that which is conventional and is directed towards effecting exactly the opposite: The case is reversed now in that the particles of synthetic resin become the core and the carrier and, in their turn, are coated with a thin layer of dyestuff particles, the layer being as homogeneous and homodisperse as possible.

It is completely surprising that any possibility existed of obtaining in this manner re-dispersible preparations. However, after completion of this crucial forward step and after consideration of the factors with regard to the spatial proportions involved, it becomes suddenly clear that much more synthetic resin is required to evenly coat the dyestuff particles than in the reverse case where the synthetic resin is made the carrier and is coated with dyestuff particles. Therein may well be found the outstanding reason for the fact that high-percentage preparations can be produced better and more easily by the present process than by the processes known hitherto.

The following examples serve to further illustrate the invention without, however, the scope of the invention being limited by them. The term 'parts' denotes parts by weight and temperatures are expressed in degrees Centigrade.

EXAMPLE 1

20 Parts of the dyestuff of the formula

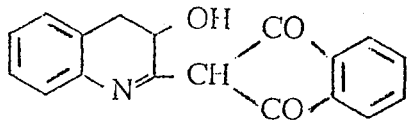

in 80 parts of cyclohexanone are ground with 150 parts of quartz sand until the particle size of the dispersion is below 10 microns, essentially below 1 – 5 microns.

After separation of the sand by filtration, 100 parts of water are added and, with vigorous stirring, 20 parts of ethylcellulose in powder form is introduced.

After homogeneous distribution of the carrier polymer, the dispersion is gently stirred while being slowly diluted with water; it is subsequently stirred until a loose, easily filterable form is obtained. Filtration under suction is performed and the yellow powder dried.

Ten parts of the preparation are dispersed, by stirring, in 90 parts of a 5 percent solution of ethylcellulose in a mixture of 50 parts of ethanol and 50 parts of methyl ethyl ketone. A paper is printed with this printing ink; the printed paper is then exposed together with a polyester fabric in a press for 30 seconds to a temperature of 210°. A brilliant fast yellow transfer print is obtained.

If, instead of ethylcellulose, ethylhydroxyethylcellulose, cellulose acetatebutyrate polymethacrylic acid ester or hydroxypropylcellulose are used, then similarly good results are obtained.

EXAMPLE 2

40 Parts of the dyestuff of the formula

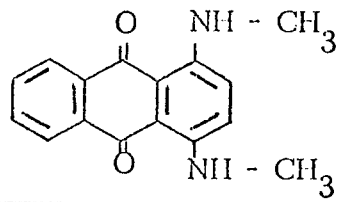

are dispersed in a solution of 2 parts of ethylcellulose in 58 parts of cyclohexanone, and the dispersion ground in a sand mill until the particle size is essentially between 1 and 2 microns.

After removal of the sand, there is added to this dispersion, with thorough stirring, a dispersion of 8 parts of finely powdered ethylcellulose in 100 parts of water. After homogenisation of the mass, a further 400 parts of water are added; the whole is stirred for an hour, filtered, and the obtained preparation in the form of granules dried in vacuo.

The blue powder possesses similarly good properties to those of the preparation described in Example 1.

If, instead of the above stated dyestuff, there are used 40 parts of the dyestuff from Example 1, with otherwise the same procedure as described, then a yellow preparation is obtained having similarly good properties.

Fast printings are obtained with both preparations, in a manner analogous to that described in Example 1.

EXAMPLE 3

50 Parts of the dyestuff of the formula

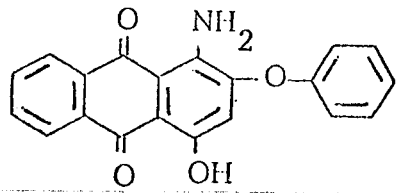

are dispersed in 50 parts of a 2 percent solution of ethylcellulose in n-butanol; the dispersion is then ground in a sand mill until the particle size of the dispersion is below 10 microns. The sand is afterwards removed; 100 parts of water are added to the dispersion and 11.5 parts of finely powdered ethylcellulose stirred in. After homogenisation of the mass by use of a stirrer, an addition is slowly made of 900 parts of water, and stirring continued until the preparation is in an early filterable form. It is then filtered, subsequently washed with water, and dried in vacuo at 70°. A red powder is thus obtained which can be very easily dispersed in a printing ink prepared from ethanol/methyl ethyl ketone and ethylcellulose.

If methyl ethyl ketone is used instead of n-butanol, the procedure being otherwise as described above, then a similarly good result is obtained.

If, instead of ethylcellulose, cellulose acetatebutyrate or polymethacrylic acid ethyl ester is used, then similarly good preparations are obtained.

EXAMPLE 4

20 Parts of the dyestuff of the formula $$\text{[anthraquinone structure with } NH_2, CN, \text{ and } NH\text{-phenyl substituents]}$$

are ground in a solution of 5 parts of ethylcellulose in 75 parts of cyclohexanone until the particle size is below 5 microns.

After removal of the sand employed as the grinding medium, 100 parts of water are added to the dispersion as this is vigorously stirred. After the addition of a further 900 parts of water, a slow stirring is maintained until the dispersion has assumed a readily filterable form; it is subsequently filtered and dried. With the procedure as described in Example 1, fast blue printings on polyamide and polyester fibres are obtained with this product.

If, instead of cyclohexanone, isophorone, mesityl oxide, methyl isobutyl ketone, n-pentanol, n-hexanol or cyclohexanol are used, then similarly good results are obtained.

EXAMPLE 5

40 Parts of the blue dyestuff mentioned in Example 2 are ground in 100 parts of a solution of 1 part of ethylcellulose in methyl ethyl ketone and 50 parts of water with 200 parts of quartz sand; grinding is continued until a fine dispersion having a particle size of below 10 microns is obtained. The sand is thereupon separated and 9 parts of finely powdered ethylcellulose stirred in; the suspension is then diluted with 400 parts of water, filtered under suction, and the obtained product dried.

The resulting product is a blue powder having properties equally as good as those of the powder described in Example 2.

EXAMPLE 6

30 Parts of the dyestuff mentioned in Example 5 are ground in 70 parts of cyclohexanone, with the addition of 1 part of hydroxypropylcellulose and the addition also of 200 parts of sand, until the particle size is below 10 microns.

The sand is then removed and 200 parts of water added; 29 parts of solid oxypropylcellulose in powder form are stirred in and the whole diluted with 200 parts of water; the precipitate is filtered off and dried. 20 Parts of the preparation are dispersed, with stirring, in 80 parts of water.

This dispersion is used to impregnate a paper band on the padding machine, the paper being then dried. It is afterwards heated together with a polyamide fabric in a press for 30 seconds at 190°. There is thus obtained a fast blue dyeing.

EXAMPLE 7

40 Parts of the dyestuff mentioned in Example 5 are ground in 60 parts of water with the addition of 1 part of oxypropylcellulose and 200 parts of quartz sand for 24 hours.

The sand is removed and 60 parts of cyclohexanone are added to the dispersion. To this two-phase system there are then added, with vigorous stirring, 40 parts of finely powdered ethylcellulose. After homogenisation of the mixture, the solvent is distilled off in vacuo as an azeotrope, and the preparation filtered off and dried.

The preparation can be used according to the data given in Example 1 for the production of blue printings.

EXAMPLE 8

20 Parts of the dyestuff of the formula $$\text{C}_6\text{H}_5-N=N-\text{C}_6\text{H}_4-N=N-CH\begin{pmatrix}CO-NH\\CO-NH\end{pmatrix}C=O$$

are ground in 80 parts of cyclohexanone with 100 parts of quartz sand until the particle size of the dispersion is between 1 and 5 microns.

The sand is removed and 100 parts of water added; an addition is then made, with vigorous stirring, of 20 parts of ethylhydroxyethylcellulose. The dispersion is subsequently diluted, with gentle stirring, with water until a readily filterable form is obtained; it is afterwards filtered off under suction and dried.

2 Parts of this dispersion are dispersed in 100 parts of perchloroethylene at room temperature, and diluted to 1,000 parts. After the addition of 0.5 parts of Versamid 962, the dispersion is refluxed for 30 minutes, and filtered hot through a paper filter. There remains no residue.

100 Parts of a polyester yarn are then dyed for 30 minutes, under refluxing conditions, in this dispersion. There is thus obtained a fast yellow dyeing.

An equally good preparation giving red dyeings is obtained with the dyestuff 1-amino-2-oxyethoxy-4-hydroxyanthraquinone.

EXAMPLE 9

30 Parts of carbon black are dispersed in 70 parts of cyclohexanone, and ground in a sand mill until the particle size of the dispersion is essentially below 1 micron.

The sand is removed and 3 parts of ethylcellulose stirred in. 100 Parts of water are then added and, with stirring, 27 parts of finely powdered ethylcellulose introduced. The whole is diluted, with stirring, with a further 500 parts of water, filtered under suction and dried.

The preparation can be easily dispersed in a printing ink consisting of 45 parts of ethanol, 45 parts of methyl ethyl ketone, 8 parts of ethylcellulose and 2 parts of Hoechst-Wachs PA-520, and gives on paper strong black printings.

EXAMPLE 10

50 Parts of 2,2'-dimethoxy-dibenzanthrone are ground in a solution of 1 part of hydroxypropylcellulose in 49 parts of cyclohexanone with the addition of 200 parts of quartz sand; grinding is continued until the particle size is essentially below 1 micron.

After separation of the sand, the dispersion is stirred into 100 parts of a solution of 9 parts of hydroxypropylcellulose in 91 parts of water.

The extremely fine milky-green dispersion is, after dilution to 500 parts, divided into two parts. The first half is worked up by spray drying, whereby a light, easily dispersible powder is obtained. The second half is diluted with 750 parts of water to give a total volume of 1,000 parts.

A cotton fabric is impregnated in this dispersion on the padding machine, and squeezed out to give a liquor absorption of 70 percent. The material is then dried with hot air, and, after passing through a second padding machine with an aqueous solution of 40 parts of sodium hydroxide and 40 parts of sodium dithionite per litre of water, steamed for 60 seconds.

The dyeing is finished in the usual manner by oxidation, rinsing, neutralising, soaping and drying.

An even, very brilliant green dyeing is obtained.

If, instead of hydroxypropylcellulose, carboxymethylcellulose or polyvinyl alcohol is used, with otherwise the same procedure as that described, then similarly good results are obtained.

EXAMPLE 11

15 Parts of chlorinated copper phthalocyanine are ground in 84 parts of methyl ethyl ketone and 1 part of ethylcellulose with the addition of 100 parts of quartz sand until the particle size is essentially below 1 micron.

The sand is removed by filtration and 100 parts of water are added; 14 parts of ethylcellulose are then stirred in and, after good homogenisation, the dispersion diluted with 400 parts of water. The powder is filtered off, dried and ground.

The preparation process is repeated and, after removal of the sand, 14 parts of ethylcellulose are dissolved in the dispersion, and this filtered through a pressure filter; an addition is then slowly made, with stirring, of 100 parts of water, the methyl ethyl ketone removed by steam distillation, filtration under suction performed and the obtained product dried.

Preparations are obtained which can be processed into a printing ink according to the data given in Example 1, and which produce on paper strong, transparent, green shades.

EXAMPLE 12

30 Parts of 4,4'-diamino-1,1'-dianthraquinonyl are ground in 70 parts of cyclohexanone, with the addition of 200 parts of Siliquarzit beads of 1 mm diameter, until the size of the particles still visible does not exceed 1 micron. The beads are then separated. An addition of 300 parts of water is then made, and 30 parts of finely powdered ethylcellulose having a substitution degree of 2.5 are stirred in. After thorough mixing in a toothed disc mill, the mixture is diluted to 1,000 parts total volume by the slow addition of water. Stirring is continued until an easily filterable form is obtained; filtration is then performed and the obtained product dried.

The obtained powder can be stirred in acetone to give an extremely fine dispersion. It is used for the spin dyeing of cellulose acetate from an acetonic solution.

If a powder is used on triacetylcellulose, then a similarly good result is obtained. The preparation can be very finely dispersed in methylene chloride or chloroform and is used for the mass dyeing of cellulose triacetate.

If a powder from a mixed polymer of vinyl chloride and vinyl acetate is used, then a preparation is obtained which likewise can be very easily dispersed in methylene chloride, and is employed for the dyeing of polyvinyl chloride fibres in the mass. If an acetone-soluble mixed polymer from acrylonitrile, vinyl chloride and vinylidene chloride is used, then a preparation is obtained which is very readily dispersible in acetone, and can be used for the spin-dyeing of modified acrylonitrile fibres and acetylcellulose fibres. The cyclohexanone in the last-named case is to be replaced by n-butanol.

EXAMPLE 13

30 Parts of the dyestuff of the formula

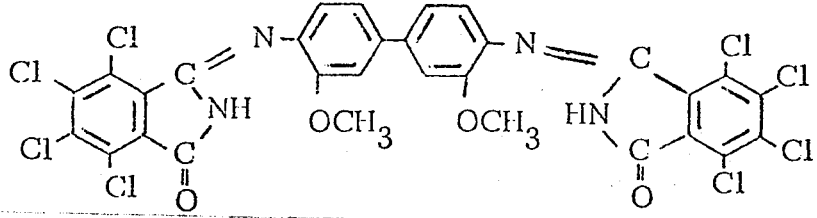

are ground in 70 parts of cyclohexanone with the addition of 200 parts of quartz sand until the particle size of the dispersion is below 2 microns. The sand is removed by filtration and 100 parts of water are added; 30 parts of finely powdered abietic acid ester are stirred in and the whole, after thorough mixing, is diluted with a further 500 parts of water. After standing overnight, the suspension is filtered and the obtained powder dried.

It can be very easily dispersed in aromatic solvents and is employed for the colouring of printing pastes and inks.

A similarly good result is obtained with polypale ester instead of abietic acid ester.

With cellulose acetobutyrate instead of abietic acid ester, a preparation is obtained which can be very readily dispersed in ketones and alcohols, and is applicable for the manufacture of coloured lacquers.

Good results are also obtained with carbon black, indigo, quinacridone and copper phthalocyanine.

EXAMPLE 14

30 Parts of carbon black are ground in 70 parts of cyclohexanone with the addition of 100 parts of quartz sand until the particle size is below 1 micron. The sand is removed and 30 parts of magnesium behenate are stirred into the dispersion; 100 parts of water are then added with vigorous stirring and the whole diluted with a further 500 parts of water; filtration is carried out and the resulting black powder dried.

2 Parts of this powder are suspended in 8 parts of a 10% solution of low-polymeric polyethylene in cyclohexanone, and the whole is intimately mixed with 100 parts of polypropylene granulate. 20 Parts of water are then slowly added with vigorous stirring. The suspension is subsequently diluted with a further 100 parts of water, the liquid decanted, and the obtained product dried.

Spun from the melt, polypropylene fibres are obtained dyed in a beautiful homogeneous black.

A similar result is obtained on polyamide fibres.

A fast green shade is obtained with the use of chlorinated phthalocyanine.

EXAMPLE 15

20 Parts of the dyestuff of the formula

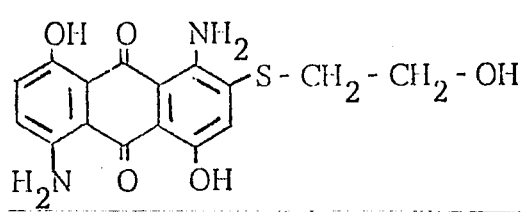

are ground in 80 parts of cyclohexanone with the addition of 1 part of a polyvinyl ether of octadecyl alcohol with 200 parts of quartz sand until the particle size of the dispersion does not essentially exceed 5 microns.

The sand is then removed and 200 parts of water added; a finely powdered mixture of 4 parts of Antaron V 220, an alkylated polyvinylpyrolidone of MW 8600, and 15 parts of polyvinyl ether of octadecyl alcohol is stirred in. The whole is thoroughly stirred and a further 600 parts of water added; the precipitated powder is filtered off and dried. A blue powder is obtained which can be easily dispersed in tetrachloroethylene, and which yields fast blue dyeings on polyester fibres, the procedure being according to the data given in Example 8.

EXAMPLE 16

30 Parts of the dyestuff of the formula

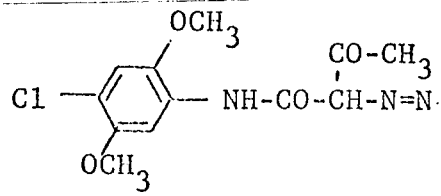 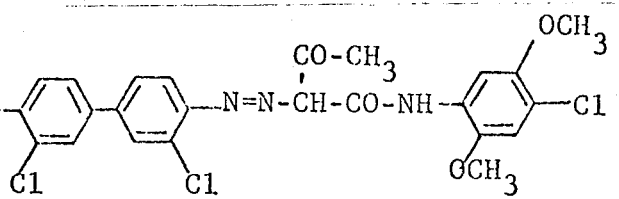

in a solution of 1 part of ethylcellulose in 69 parts of secondary butanol saturated with water are ground with sand until the particle size of the dyestuff is below 1 micron, whereupon the sand is removed. 10 Parts of water are then added to the dyestuff mixture and 9 parts of ethylcellulose stirred in; the mixture is afterwards diluted with a further amount of water, with gentle stirring, until a granular, readily filterable form is obtained; the whole is filtered and the obtained product washed and dried. The resulting preparation is easily dispersed in a paper-printing ink based on ethylcellulose and yields even yellow printings.

A similarly good preparation is obtained with the use of tertiary butanol instead of sec. butanol.

If the dyestuff of the formula

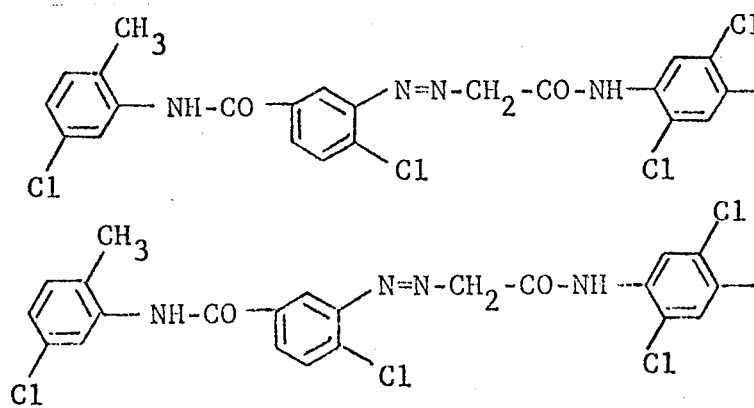

is employed, then likewise there is obtained an excellent yellow preparation.

With the dyestuff of the formula

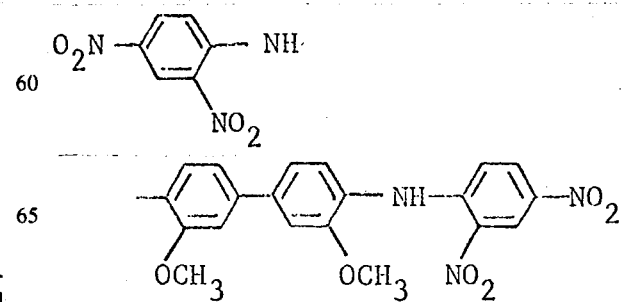

there is obtained a very fast reddish brown; and with the dyestuff of the formula

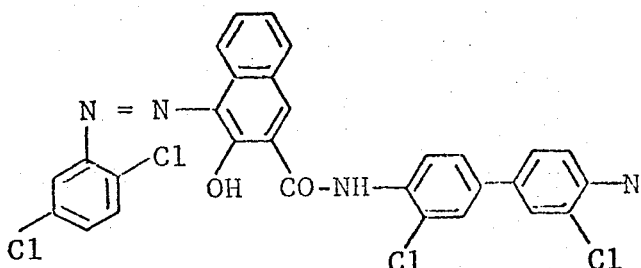 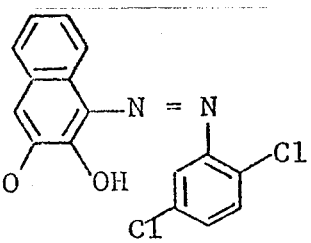

a yellowish red.

If ethyl glycol acetate is used instead of butanol, with otherwise the same procedure as described, then similarly good preparations are obtained.

EXAMPLE 17

100 Parts of 1,4-diamino-2,3-dichloroanthraquinone, in the presence of 1 part of ethylcellulose, are ground in 300 parts of secondary butanol saturated with water in a sand mill, grinding being continued until the particle size is below 2 microns.

The sand is removed from the dispersion and into this is then stirred a dispersion of 33 parts of ethylcellulose in 66 parts of water. The whole is diluted with water to 2,000 parts, passed through a disc mill, and the resulting preparation is filtered and dried.

With application of the preparation in the manner described in Example 1, there are obtained fast violet dyeings and printings. If propylcellulose or cellulose acetatepropionate are used instead of ethylcellulose, then similarly good results are obtained. Equally good preparations are obtained by the described procedure with use of the dyestuffs mentioned in Examples 1, 2, 3 and 4.

EXAMPLE 18

100 Parts of chlorinated copper phthalocyanine are ground, in a sand mill, in 400 parts of a solution of 2 parts of a vinyl chloride copolymer (obtainable commercially under the name of Rhodopas AX) in 398 parts of ethyl glycol acetate saturated with water until the size of the still visible particles is below 1 micron.

After removal of the sand, a dispersion of 98 parts of Rhodopas AX in 100 parts of water is stirred into the pigment dispersion and stirring maintained until a homogeneous state is obtained; the whole is then diluted with 2,000 parts of water. The mother liquor is filtered off under suction; 1,000 parts of water are added and stirring continued until the preparation is in a readily filterable form. Filtration under suction is performed and the resulting product dried. The obtained powder can be very finely dispersed in acetone, and is used for the dyeing in the mass of polyvinyl chloride.

A similarly good blue is obtained with copper phthalocyanine, and with carbon black a very readily dispersible black.

If, instead of ethyl glycol acetate, acetoacetic acid methyl ester or ethyl ester, formic acid ester or ethyl acetate or acetylacetone are used, then similarly good results are obtained.

EXAMPLE 19

30 Parts of carbon black, Printex 300, are ground in a solution of 0.6 part of ethylcellulose in 70 parts of secondary butanol saturated with water with glass balls until no further visible particles above 1 micron are present. The glass balls are then removed. There are then stirred into this dispersion 29.4 parts of ethylcellulose dispersed in 60 parts of water; stirring is continued until homogeneity is obtained, and the dispersion diluted with water to 500 parts. Filtration is performed and the resulting black powder dried. This is used for paper printing according to the data given in Example 10.

EXAMPLE 20

30 Parts of thioindigo are ground in 70 parts of tertiary butanol, with the addition of 0.3 part of ethylcellulose, by means of 100 parts of glass balls and 50 parts of sodium chloride. The whole is diluted with 150 parts of water and the glass balls are removed; 10 parts of ethylcellulose are stirred in, the dispersion diluted with a further 350 parts of water and filtered; the resulting product is finally washed and dried. A preparation is obtained which is well suited for printing according to the procedure described in Example 1.

EXAMPLE 21

300 Parts of the dyestuff mentioned in Example 4 are suspended in 697 parts of secondary butanol saturated with water and three parts of ethylcellulose, and ground with 2,000 parts of Siliquarzit beads of 1 mm diameter in a Dyno-Muhle (mill), type KDL15, until the particle size of the dyestuff is about 1 – 3 microns, this being the case after ca. 6 hours grinding time. The dispersion is separated from the grinding agent, and filtered through a Cuno filter having a pore size of 10 microns. 100 Parts of the dyestuff paste are well mixed with 9.7 parts of an abietic acid derivative obtainable commercially under the name of Staybelite resin, and the whole subsequently stirred up with 80 parts of water. After 5 minutes, a further 420 parts of water are slowly added; the mixture is stirred for one hour, then filtered and the residue rinsed and dried. 40 Parts of a blue powder are obtained.

3.75 Parts of the said blue powder are stirred into a printing ink consisting of 66.25 parts of ethylcellulose and 90 parts of a 50 percent mixture of isopropanol and ligroin of boiling range 110° – 140°.

A stable printing ink is obtainable which can be printed on paper. Fast blue printings are obtained on polyester fabric by transfer printing for 30 seconds at 210°.

Similarly good preparations are obtained by replacement of the above mentioned abietic acid derivative by identical parts of one of the following commercial products:

Staybelite ester No. 1, No. 3
(mono-triethyleneglycol esters of hydrogenated rosin)

Polypale ester
(glyceryl and ethyleneglycol esters of polymerized rosin)

Hochst Wachs C powder
Escorez 4110
Kunstharz (synthetic resin) AFS

The first three are likewise abietic acid derivatives; 4 and 5 are hydrocarbon resins. Regarding product 6, this is a cyclohexanone polymer. With these products too are obtained stable, non-settling, storage-stable printing inks.

EXAMPLE 22

50 Parts of N,N'-diethyldipyrazoleanthronyl are vatted at 80° – 90° in 1,000 parts of an aqueous vat containing 2 percent of sodium hydroxide and 2 percent of sodium dithionite. The whole is allowed to cool, the leuco form which has crystallised out filtered off, rinsed and dried. A yellowish red powder is obtained; this is ground in 150 parts of secondary butanol saturated with water, with the addition of 10 parts of ethylcellulose, with 400 parts of quartz sand until the particle size of the powder is below 1 micron. After removal of the grinding agent, 40 parts of alcohol-soluble cellulose acetatepropionate are stirred in; the whole is mixed with 100 parts of water and subsequently diluted with a further 500 parts of water. The mixture is filtered and the resulting blue powder dried.

40 Parts of this powder are stirred into 960 parts of denatured ethyl alcohol. This solution is then used to impregnate a fabric made from glass fibres; the material is then squeezed out to give a weight increase of 50 percent, and dried with hot air, with extraction by suction of the escaping alcohol, in a drying chamber.

There is obtained in this manner a red-dyed fabric having fastness to light and to washing. Analogous results are obtained on fabrics made from cotton and polyester.

If the dyestuff, instead of being vatted, is precipitated from a 10 percent sulphuric acid solution by discharge into water, the further treatment being as described, then a similarly good result is obtained.

We claim:

1. A process for the production of a readily dispersible concentrated, liquid or solid dyestuff preparation, comprising the sequential steps of
   a. subjecting a suspension of a difficultly water-soluble or water-insoluble dyestuff, in water and/or an organic solvent having limited solubility in water to a particle-size-reducing operation, in the presence of a mechanical grinding agent until the particle size of the suspended dyestuff is no more than 10 microns,
   b. removing the mechanical grinding agent from the dyestuff suspension
   c. adding the water or the organic solvent having limited solubility in water necessary for the formation of a two-phase system,
   d. adding, at this point or, at least in part, prior to completion of step (a), at least one high-molecular carrier selected from the group consisting of lower alkyl cellulose ether, hydroxy-lower-alkyl cellulose ether, cellulose acetate, cellulose chloroacetate, cellulose nitrate, cellulose acetate butyrate, cellulose acetate phthalate, ethyleneglycol esters of hydrogenated rosin, ethyleneglycol esters of polymerized rosin, polymethacrylic acid ethyl ester, polyvinyl alcohol, polyvinyl chloride-polyvinyl acetate copolymer, polyacrylonitrile-polyvinyl chloride-polyvinylidene chloride copolymer, magnesium behenate, and polyvinyl ether of octadecylalcohol, which carrier is soluble in water or in the organic solvent having limited solubility in water, but insoluble in the two-phase system,
   e. stirring the suspension until the organic phase containing the dyestuff has become evenly dispersed over the surface of the high-molecular carrier, and
   f. removing part of the water and/or the organic solvent to give a dyestuff preparation dispersion in water and/or organic solvent or removing substantially all of the water and the organic solvent to give a dry dyestuff preparation.

2. The process of claim 1, wherein substantially all of the water and organic solvent are removed to produce a dry dyestuff preparation.

3. The process of claim 1, wherein the mechanical particle-size-reducing operation is carried out in an organic solvent mixed or saturated with water, said solvent having limited solubility in water.

4. The process of claim 3, wherein the employed organic solvent is a ketone or an alcohol having at room temperature a water solubility of at least 1 percent and at most 30 percent.

5. The process of claim 4, wherein the employed organic solvent is methyl ethyl ketone, cyclohexanone, acetylacetone, butanol, cyclohexanol, phenylglycol, ethylglycolacetate or hexylglycol.

6. The process of claim 1, wherein the mechanical particle-size reducing operation is performed in the organic phase and in the presence of an amount of at most 20 percent, relative to the carrier substance to be coated, of an organic substance acting as a deflocculating agent, the said organic substance being idencical to or compatible with the said carrier substance and readily soluble in the organic phase but insoluble in the two-phase system.

7. The process of claim 6, wherein the employed organic substance is a cellulose ether or cellulose ester.

8. The process of claim 1, wherein the employed dyestuff is a dispersion dyestuff free from diluting agents or a water-insoluble metal-complex dyestuff.

9. The process of claim 1, wherein the dyestuff is a water-insoluble, polymer-soluble dyestuff from the group consisting of vat dyestuffs, naphthol dyestuffs and polycyclic heterocycles.

10. The process of claim 1, wherein the dyestuff is a water- and polymer-insoluble, organic or inorganic pigment.

11. The process of claim 1, wherein the dyestuff is an inorganic or organic delustring agent and/or optical brightener.

12. A preparation, made by the process of claim 1, wherein said preparation contains at least 60 and at most 90 percent of dyestuff having a particle size of below 2 microns, and at least 10 percent and at most 40 percent of one or more carriers.

* * * * *

UNITED STATES PATENT OFFICE
CERTIFICATE OF CORRECTION

PATENT NO. : 3,844,806
DATED : October 29, 1974
INVENTOR(S) : JACQUES WEGMANN ET AL It is certified that error appears in the above-identified patent and that said Letters Patent are hereby corrected as shown below:

Claim 6, column 18, line 34 should read,

-- ganic phase and in the presence of an amount (not increasing the viscosity of the dispersion) of at --.

Claims 13 and 14, column 18, after line 62, insert --

Claim 13. The process of claim 1, wherein the employed high-molecular carrier is a cellulose ether or cellulose ester.

Claim 14. The process of claim 13, wherein a water-insoluble cellulose ether or cellulose ester is used. --.

Signed and sealed this 15th day of July 1975.

(SEAL)
Attest:

RUTH C. MASON
Attesting Officer

C. MARSHALL DANN
Commissioner of Patents
and Trademarks